US007876395B2

(12) United States Patent
Ho

(10) Patent No.: US 7,876,395 B2
(45) Date of Patent: Jan. 25, 2011

(54) BACKLIGHT MODULE HAVING PHOTO SENSOR DEVICE AND LIQUID CRYSTAL DISPLAY HAVING THE SAME

(75) Inventor: Chung-Hsing Ho, Kaohsiung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 219 days.

(21) Appl. No.: 11/768,204

(22) Filed: Jun. 26, 2007

(65) Prior Publication Data

US 2008/0239205 A1 Oct. 2, 2008

(30) Foreign Application Priority Data

Mar. 27, 2007 (TW) ............................. 96110491 A

(51) Int. Cl.
*G02F 1/13357* (2006.01)
*G02F 1/133* (2006.01)
*G02F 1/1335* (2006.01)

(52) U.S. Cl. ......................... 349/64; 349/116; 362/97.2

(58) Field of Classification Search ................. 359/102; 349/61, 62, 64, 67–71, 116; 362/97.1–97.4
See application file for complete search history.

(56) References Cited

U.S. PATENT DOCUMENTS 7,026,755 B2 * 4/2006 Setlur et al. ................. 313/501
2005/0045898 A1 * 3/2005 Leu et al. ....................... 257/98
2005/0073495 A1 * 4/2005 Harbers et al. .............. 345/102
2005/0134811 A1 * 6/2005 Magarill et al. ............... 353/94
2005/0135441 A1 * 6/2005 Ng et al. ................ 372/29.014
2005/0270447 A1 * 12/2005 Tasaka et al. .............. 349/113
2006/0049781 A1 3/2006 Lee et al.
2006/0250567 A1 * 11/2006 Yu et al. ..................... 349/181
2007/0170449 A1 * 7/2007 Anandan ..................... 257/98
2009/0140656 A1 * 6/2009 Kohashikawa et al. ...... 315/151

FOREIGN PATENT DOCUMENTS

KR 1020060081801 * 7/2006
WO 2007/020720 2/2007

OTHER PUBLICATIONS

Im, Jeong-Un. Machine translation of Korean Unexamined Patent Application Publication No. 10-2006-0081801.*

* cited by examiner

*Primary Examiner*—David Nelms
*Assistant Examiner*—Michael Inadomi
(74) *Attorney, Agent, or Firm*—Jianq Chyun IP Office

(57) ABSTRACT

A backlight module is provided. The backlight module includes a frame, a plurality of light emitting elements, at least one photo sensor device and a diffusing plate. The frame has a bottom plate on which the plurality of light emitting elements are disposed. The photo sensor device is distributed on the bottom plate and among the plurality of light emitting elements. It is to be noted that the photo sensor device includes a light mixing component having a receiving space configured at a bottom thereof, and a photo sensor chip received in the receiving space. The diffusing plate is disposed in the frame and above the light emitting elements and the photo sensor device. The backlight module has an excellent light outputting performance and an LCD using the same has better displaying performance.

27 Claims, 3 Drawing Sheets

260 260 250 240
232 S 234 220 212 210 200
230

BACKLIGHT MODULE HAVING PHOTO SENSOR DEVICE AND LIQUID CRYSTAL DISPLAY HAVING THE SAME

CROSS-REFERENCE TO RELATED APPLICATION

This application claims the priority benefit of Taiwan application Ser. No. 96110491, filed Mar. 27, 2007. All disclosure of the Taiwan application is incorporated herein by reference.

BACKGROUND OF THE INVENTION

1. Field of the Invention

The present invention generally relates to a light module and a display having the same, and particularly to a backlight module and a liquid crystal display (LCD) having the same.

2. Description of Related Art

Generally, a backlight module provides a plane light source for an LCD panel for displaying. Conventional backlight modules are classified into two types, direct type backlight module, and side type backlight module. Typically, direct type backlight modules can provide surface sources brighter than side type backlight module. Therefore, direct type backlight modules are more often adopted when higher brightness of the light sources is required. Conventional direct type backlight modules are illustrated as below for reference.

FIG. 1 is a cross-sectional view of a conventional direct type backlight module. Referring to FIG. 1, the conventional direct backlight module 100 includes a frame 110, a plurality of light emitting diodes (LED) 130, and a diffusing plate 140. The frame 110 includes a bottom plate112. The LEDs 130 are disposed on the bottom plate 112, and the diffusing plate 140 is disposed in the frame 110 and over the LEDs 130. The LEDs 130 are adapted for emitting red light, green light, and blue light, respectively, which can be evenly mixed into white light and thereafter pass through the diffusing plate, thus providing a white light source for the LCD.

However, the operation temperature of the LEDs 130 will increase when the LEDs 130 are used for a long time. Thereby, the light emitting efficiencies of the LEDs 130 gradually deteriorated, and the light emitting efficiencies of the LEDs 130 which emitting different color lights deteriorated with different rates. Therefore, the LCD exhibits an unstable image quality, for in capable of maintaining the original chroma and brightness. As a solution, at least one photo sensor chip 150 is often employed for sensing the chroma and the brightness thereof. The photo sensor chip 150 transmits signals generated thereby corresponding the obtained chroma and/or brightness to a driving circuit (not shown) for adjusting and compensating the light emitted from the LEDs 130.

The photo sensor chip 150 is a flat chip, which front side is often the primary side to be illuminated. In order to sense the chroma and the brightness of the light correctly, the photo sensor chips 150 should be distributed in areas where the light of different colors are most evenly mixed, mostly in front of the diffusing plate 140 as shown in FIG. 1. According to such a design, the photo sensor chip 150 can sense the most evenly mixed light so as to accurately evaluate the light provided by the backlight module 100, and consult the driving circuit to properly adjust and compensate.

However, unfortunately, the photo sensor chip 150 somehow blocks the light provided by the backlight module 100, thus affects the light output efficiency of the backlight module 100.

SUMMARY OF THE INVENTION

Accordingly, the present invention is directed to a backlight module for providing a solution of the low light output efficiency of conventional backlight modules.

The method is also directed to provide an LCD using the foregoing backlight module for improving image quality thereof.

The present invention provides a backlight module. The backlight module includes a frame, a plurality of light emitting elements, at least one photo sensor device, and a diffusing plate. The frame has a bottom plate, and the light emitting elements are disposed on the bottom plate. The photo sensor device is distributed on the bottom plate and among the plurality of light emitting elements. It is to be noted that the photo sensor device includes a light mixing component having a receiving space configured at a bottom thereof, and a photo sensor chip received in the receiving space. The diffusing plate is disposed in the frame and above the light emitting elements and the photo sensor device.

According to an embodiment of the present invention, the foregoing light mixing component is made of polymethylmethacrylate (PMMA), or polyethylene terephthalate (PET).

According to an embodiment of the present invention, the foregoing light mixing component has a plurality of diffusion particles distributed inside the light mixing component. In another hand, the light mixing component may further include a plurality of diffusion patterns configured on a surface thereof.

According to an embodiment of the present invention, a top of the receiving space of the light mixing component is for example solid or hollow, and an upper portion of the light mixing component is for example cone shaped, column shaped, or semi-sphere shaped. According to an aspect of the embodiment, the light mixing component may be configured to be column shaped or cone shaped.

According to an embodiment of the present invention, the foregoing bottom plate has a reflective surface, for reflecting back the light emitting elements.

According to an embodiment of the present invention, the foregoing light emitting elements includes a plurality of red LEDs, a plurality of blue LEDs, and a plurality of green LEDs.

According to an embodiment of the present invention, the backlight module further includes an optical film set disposed on the diffusing plate.

The present invention also provides an LCD using the foregoing backlight module as a plane light source. The LCD includes a LCD panel and a backlight module. The backlight module is disposed at a side of the LCD panel. The backlight module is as discussed above.

In the backlight module according to the present invention, the light mixing component is disposed on the photo sensor chip, so that the photo sensor chip can be disposed on the bottom plate, instead of at where the light is outputted. In such a manner, the photo sensor chip is capable of accurately sensing the light outputting of the backlight module without reducing the light output efficiency of the backlight module. Therefore, signals are transmitted to the driving circuit for correctly adjusting and compensating the light outputted from the backlight module. LCDs using such backlight modules of the present invention as plane light source are suitable of maintaining excellent and stable image quality for a relative long time.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
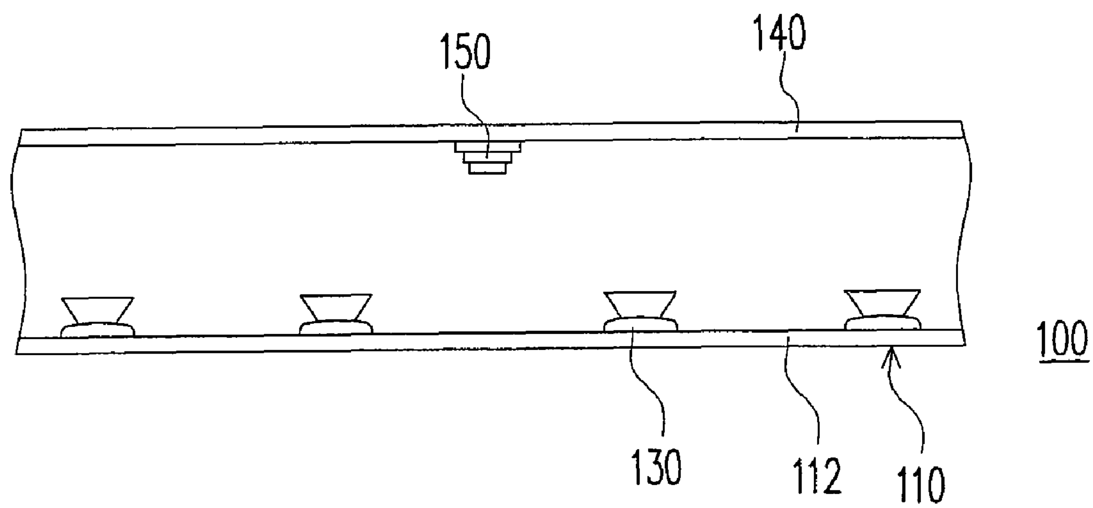
FIG. 1 is a cross-sectional view of a conventional direct type backlight module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
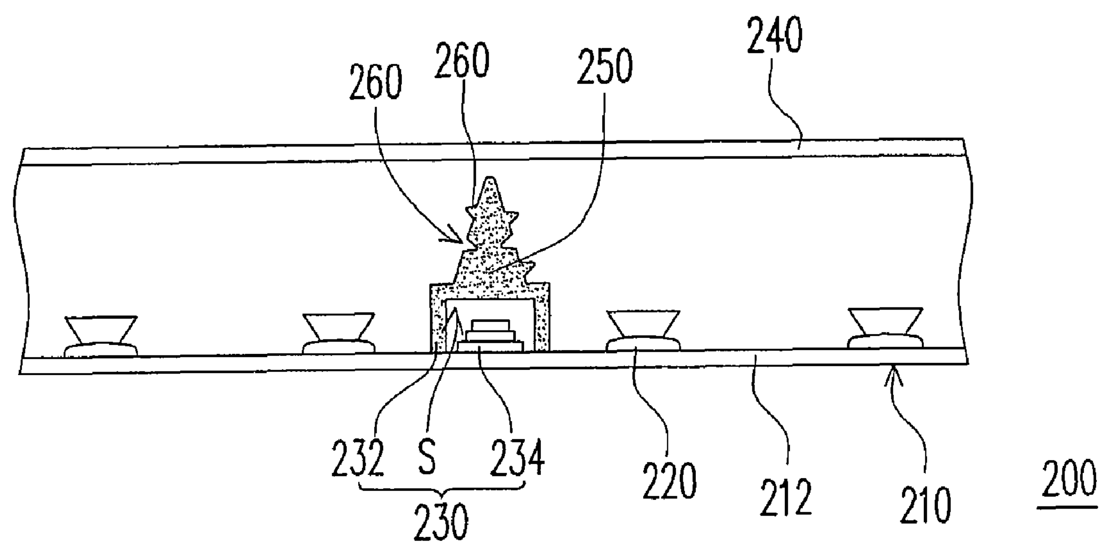
FIG. 2 is cross-sectional view of a backlight module according to an embodiment of the present invention.

FIG. 2 is cross-sectional view of a backlight module according to an embodiment of the present invention. Referring to FIG. 2, a backlight module 200 is illustrated. The backlight module 200 includes a frame 210, a plurality of light emitting elements 220, and at least one photo sensor device 230. The frame 210 has a bottom plate 212, on which the light emitting elements 220 are disposed. The photo sensor device 230 is distributed on the bottom plate 212 and among the plurality of light emitting elements 220. It is to be noted that the photo sensor device 230 includes a light mixing component 232 having a receiving space S configured at a bottom thereof, and a photo sensor chip 234 received in the receiving space S. The backlight module 200 further includes a diffusing plate 240 disposed in the frame 210 and above the light emitting elements 220 and the photo sensor device 230.

According to an aspect of the embodiment, the light emitting elements 220 for example are light emitting diodes (LED). LEDs have advantages of long lifetime, requiring no idling time, fast response (about 9-10 ms), slimness, power saving, low contamination, highly reliable, and being suitable for mass production. Specifically, a white LED generally presents a relative low light output efficiency, inferior chroma and displaying color temperature, comparing with white light obtained by mixing three color lights of three color LEDs with a certain ratio. Therefore, according to an embodiment of the present invention, the light emitting elements 220 includes a plurality of red LEDs, a plurality of blue LEDs, and a plurality of green LEDs. Quantities of each kind of LEDs are designed according to a certain ratio, and distribution of the LEDs are correspondingly designed so as to allow the light emitted therefrom to be suitable for being mixed into white light.

In operation, after long time using, a light emitting efficiency of the LEDs decreases when the operation temperature increases. However, LEDs for emitting light of different colors decreases with different ratios, respectively. Therefore, the backlight module 200 correspondingly exhibits unstable outputting performance. As such, it is important to accurately sense or detect the light outputting performance of the backlight module in its entirety, by which the light outputting can be adjusted and compensated.

In general, photo sensors are often employed at where different color lights are most evenly mixed, e.g., location of the photo sensor chip as shown in FIG. 1, for accurately detect and sensing the light outputting performance of the backlight module 200. However, such an arrangement negatively affects the light outputting efficiency of the backlight module 200. Addressing to this difficulty, the present invention provides a solution, in that a light mixing component 232 is employed, to which the photo sensor chip 234 is combined to configure the photo sensor device 230. The light mixing component 232 is adapted for mixing color lights into for example white light. There is a receiving space S configured at a bottom of the light mixing component 232. The photo sensor chip 234 is received in the receiving space S. In operation, light emitted from the light emitting elements 220 can be evenly mixed in the light mixing component, so that the photo sensor chip 234 received in the receiving space S can detect and sense the mixed light. In other words, the photo sensor chip 234 in position is adapted to accurately sense and detect the light outputting performance of the backlight module 200 in entirety, and signals obtained thereby are then transmitted to a driving circuit (not shown). According to the signals, the light outputting performance can be adjusted and compensated. As such, the photo sensor device 230 is not necessarily disposed at where the light is outputted. In this embodiment, the photo sensor device 230 is disposed on the bottom plate 212, and thus the light outputting efficiency of the backlight module 200 is not affected.

According to an aspect of the embodiment, in the backlight module 200, the light mixing component 232 for example is made of polymethylmethacrylate (PMMA), or polyethylene terephthalate (PET). However, in other embodiments, the light mixing component 232 can also be made of other transparent materials or semitransparent materials. The light mixing component 232 is adapted for evenly mixing, diffusing, and refracting light emitted from the light emitting elements 220 no matter far or near the light mixing component 232, so as to allow the photo sensor chip 234 to accurately sense and detect the light outputting performance of the backlight module 200 in entirety.

According to other embodiments, other approaches can be applied for more evenly mixing the lights emitted from the light emitting elements 220 by the light mixing component 232. For example, the light mixing component 232 can include a plurality of diffusing particles distributed in the light mixing component 232, so as to cause more diffusion of the light, assisting the lights to mix. In another hand, the light mixing component 232 can also include a plurality of diffusion patterns 260 configured on a surface thereof. The diffusion patterns 260 for example are recesses and/or protrusions of different sizes and shapes. The diffusion patterns 260 are adapted to refracting and diffusing lights with different directions, thus assisting the light mixing. Therefore, the employment of the light mixing component 232 eliminates the necessity to dispose the photo sensor device 230 at where the light is outputted of the backlight module 200, while effectively sensing and detecting the evenly mixed lights. Accordingly, the photo sensor device 230 can be disposed on the bottom plate 212, so that the disposition of the photo sensor device 230 does not affect light outputting performance of the backlight module 200. In such a manner, better light outputting performance can be achieved by the backlight module 200 according to the embodiment of the present invention.

Further, according to an aspect of the embodiment, one or even more photo sensor devices 230 can be employed according to practice. The photo sensor devices 230 are preferably distributed among part of the light emitting elements 220. For example, in the present embodiment, a single photo sensor device 230 is disposed on a position of the bottom plate 212 where the color of the light is most likely to be varied. According to another embodiment of the present invention, a plurality of photo sensor devices 230 are employed and disposed on a plurality of positions of the bottom plate 212, where the color tune of the light is likely to be varied. Further, for better sensing the lights, according to another embodiment of the present invention, a plurality of photo sensor devices 230 are employed and distributed on the bottom plate 212, each being disposed a certain distance away from another. In such a manner, the backlight module 200 can obtain a better light outputting performance, and even after long time using, the light outputting performance can be correctly adjusted so as to be maintained at a stable condition.

Further, in the backlight module 200, the bottom plate 212 of the frame 210 for example includes a reflective surface for reflecting back the lights emitted from the light emitting elements 220, so as to improve outputting brightness of the backlight module 200, namely the light outputting performance of the backlight module 200. The bottom plate 212 according to the embodiment of the present invention is made of a metal material. However, according to other embodiments, the bottom plate 212 can also be made of non-metal materials. For example a reflective material can be coated on the bottom plate 212 to configure the reflective surface, or otherwise a reflective plate can be attached to the bottom plate 212. Furthermore, according to still another embodiment of the present invention, an optical film set (not shown) including at least an anti-reflection film and a prism plate can be disposed on the diffusing plate for even better light outputting performance of the backlight module 200.

Figure 3A:
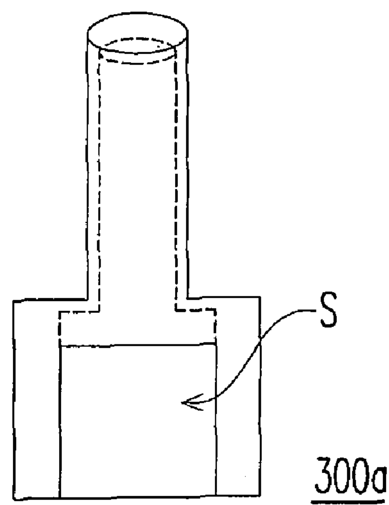
FIGS. 3A through 3D are schematic structural diagrams illustrating light mixing components of four embodiments of the present invention.
Figure 3B:
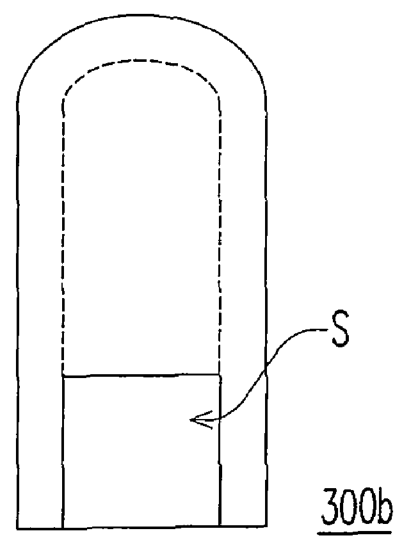
Figure 3C:
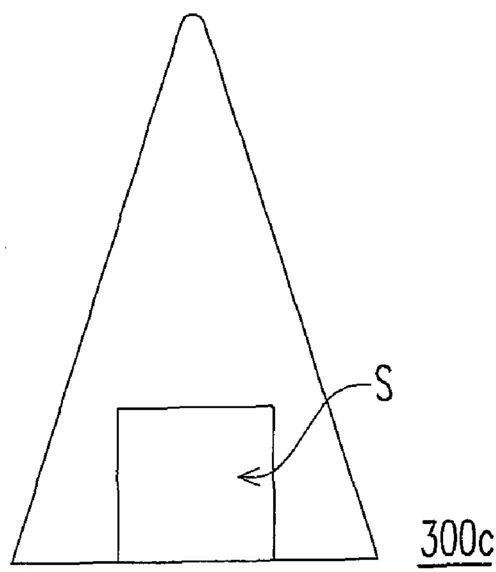
Figure 3D:
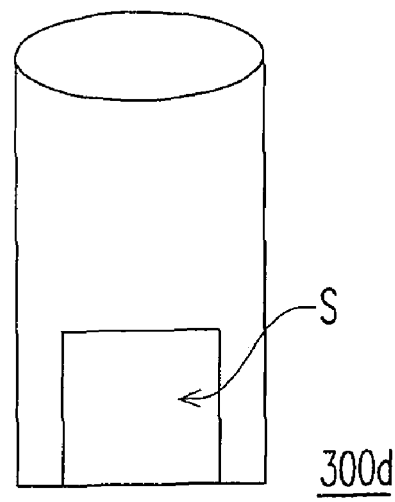

In the embodiment, the light mixing component 232 includes a cone shaped top portion. A portion of the light mixing component 232 positioned above the receiving space S is for example solid. However, the present invention does not limit the solid preference as a must, while hollow portion can also be used corresponding to the solid portion in other embodiments. FIGS. 3A through 3D are schematic structural diagrams illustrating light mixing components of four embodiments of the present invention. However, such embodiments are preferably illustrated without further limiting the spirit and scope of the present invention. In practice, the top portion of the light mixing component 232 may have other shapes. As shown in FIGS. 3A and 3B, the light mixing components 300*a* and 300*b* are column shaped and semi-sphere shaped. According to another embodiment, the portion of the light mixing component 232 positioned above the receiving space S is for example hollow. Likewise, the cone shaped light mixing component 232 shown in FIG. 2 can also be designed to have the similar hollow portion. Further, other geometrical shapes may also be configured by the light mixing component 232. For example, as shown in FIGS. 3C and 3D, the light mixing component 300*c* and the light mixing component 300*d* shown therein are column shaped and cone shaped, respectively. The light mixing components shown in the above drawings and embodiments can be, according to other concerns, practically configured to be solid, hollow, or any other shapes, or even further include different diffusion particles or different diffusion patterns.

Figure 4:
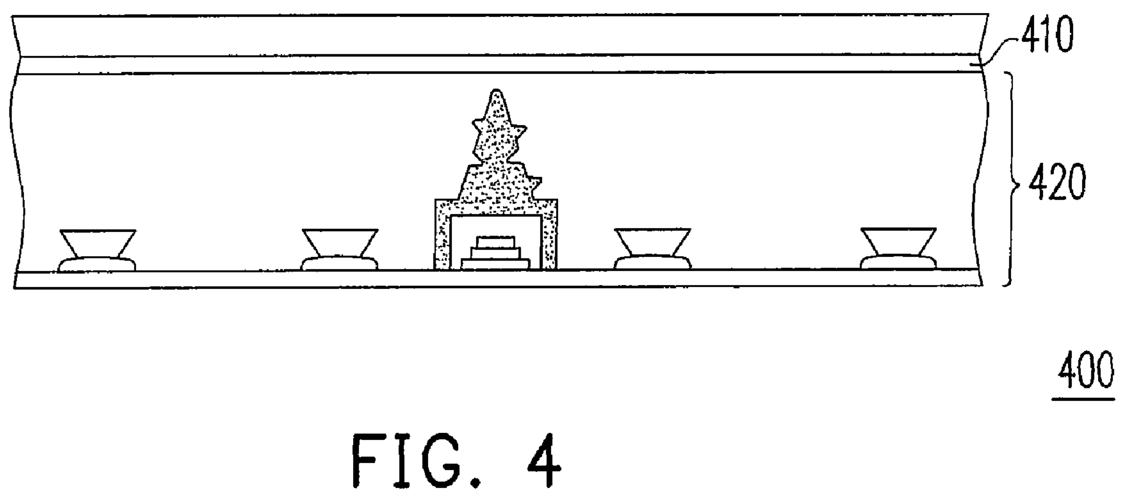
FIG. 4 is cross-sectional view of an LCD according to an embodiment of the present invention.

Moreover, the present invention provides an LCD using the backlight module according to the foregoing embodiments as a plane light source. FIG. 4 is cross-sectional view of an LCD according to an embodiment of the present invention. As shown in FIG. 4, the LCD 400 includes an LCD panel 410, and a backlight module 420 disposed at one side of the LCD panel 410. In details, the LCD 400 further includes an external frame (not shown) disposed in front of the LCD panel 410. The external frame together with the frame of the backlight module clamps and fixes the LCD panel 410. Units of the backlight module 420 and the structural relationship therebetween can be as illustrated in any of the foregoing embodiments. As discussed above, the backlight module 420 is adapted to maintain a stable light outputting performance. As such, the LCD 400 using the backlight module 420 can obtain excellent and stable displaying performance.

In summary, the backlight module and the LCD using the same as a plane light source according to the present invention have at least the following advantages: the backlight module of the present invention employs a photo sensor device having a simple structure to sense and detect lights emitted from the light emitting elements disposed in different positions, so as to effectively adjust and compensate the light outputting of the backlight module; the backlight module has the photo sensor device disposed on the bottom plate, thus avoiding affection of the light outputting and achieving better light outputting performance; and the LCD using such a backlight module according to the present invention has excellent display performance, which can be maintained stable even after long using.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:

a frame having a bottom plate;

a plurality of light emitting elements, disposed on the bottom plate, wherein the light emitting elements emit light and do not detect and sense light; and at least one photo sensor device, disposed on the bottom plate and disposed between the light emitting elements, wherein the photo sensor device detects and senses light and does not emit light, the photo sensor device comprising:

a light mixing component having a receiving space configured at a bottom thereof; and a photo sensor chip, received in the receiving space, wherein the light mixing component encapsulates a top surface and side surfaces of the photo sensor chip and does not encapsulate the light emitting elements.

2. The backlight module according to claim 1 further comprising a diffusing plate disposed in the frame and over the light emitting elements and the photo sensor device.

3. The backlight module according to claim 2, wherein a distance between the diffusing plate and the light emitting elements is larger than a distance between the diffusing plate and the photo sensor device.

4. The backlight module according to claim 1, wherein the light mixing component is made of a transparent material or a semi-transparent material.

5. The backlight module according to claim 4, wherein the light mixing component is made of polymethylmethacrylate (PMMA), or polyethylene terephthalate (PET).

6. The backlight module according to claim 1, wherein the light mixing component further comprises a plurality of diffusion particles distributed in the light mixing component.

7. The backlight module according to claim 1, wherein the light mixing component further comprises a plurality of diffusion patterns configured on a surface of the light mixing component.

8. The backlight module according to claim 1, wherein a top portion of the light mixing component is cone shaped, column shaped, or semi-sphere shaped.

9. The backlight module according to claim 1, wherein the light mixing component is column shaped or cone shaped.

10. The backlight module according to claim 1, wherein a portion in the light mixing component positioned over the receiving space is solid or hollow.

11. The backlight module according to claim 1, wherein the bottom plate comprises a reflective surface for reflecting light emitted from the light emitting elements.

12. The backlight module according to claim 1, wherein the light emitting elements comprise a plurality of red LEDs, a plurality of blue LEDs, and a plurality of green LEDs.

13. The backlight module according to claim 1 further comprising a diffusing plate disposed over the light emitting elements and the photo sensor device and an optical film set disposed on the diffusing plate.

14. A liquid crystal display (LCD), comprising:

an LCD panel; and a backlight module as set forth in claim 1, the backlight module disposed at one side of the LCD panel.

15. The LCD according to claim 14 further comprising a diffusing plate disposed in the frame and over the light emitting elements and the photo sensor device.

16. The LCD according to claim 14, wherein the light mixing component is made of a transparent material or a semi-transparent material.

17. The LCD according to claim 14, wherein the light mixing component is made of polymethylmethacrylate (PMMA), or polyethylene terephthalate (PET).

18. The LCD according to claim 14, wherein the light mixing component further comprises a plurality of diffusion particles distributed in the light mixing component.

19. The LCD according to claim 14, wherein the light mixing component further comprises a plurality of diffusion patterns configured on a surface of the light mixing component.

20. The LCD according to claim 14, wherein a top portion of the light mixing component is cone shaped, column shaped, or semi-sphere shaped.

21. The LCD according to claim 14, wherein the light mixing component is column shaped or cone shaped.

22. The LCD according to claim 14, wherein a portion in the light mixing component positioned over the receiving space is solid or hollow.

23. The LCD according to claim 14, wherein the bottom plate comprises a reflective surface for reflecting light emitted from the light emitting elements.

24. The LCD according to claim 14, wherein the light emitting elements comprise a plurality of red LEDs, a plurality of blue LEDs, and a plurality of green LEDs.

25. The LCD according to claim 14, wherein the backlight module further comprises a diffusing plate disposed over the light emitting elements and the photo sensor device and an optical film set disposed on the diffusing plate.

26. The backlight module according to claim 1, wherein the photo sensor device has a height higher than that of the light emitting elements.

27. The backlight module according to claim 1, wherein the light emitting elements, the light mixing component and the photo sensor chip are all disposed on the same surface of the bottom plate.

* * * * *